US012752696B2

(12) United States Patent
Darlage et al.

(10) Patent No.: US 12,752,696 B2
(45) Date of Patent: Oct. 6, 2026

(54) LOW BEAM DIMMING METHOD FOR SITUATIONAL GLARE

(71) Applicant: Valeo Vision, Bobigny (FR)

(72) Inventors: Colby Darlage, Troy, MI (US); Robert Fraizer, Auburn Hills, MI (US)

(73) Assignee: Valeo Vision, Bobigny (FR)

( * ) Notice: Subject to any disclaimer, the term of this patent is extended or adjusted under 35 U.S.C. 154(b) by 27 days.

(21) Appl. No.: 18/985,298

(22) Filed: Dec. 18, 2024

(65) Prior Publication Data

US 2026/0167090 A1 Jun. 18, 2026

(51) Int. Cl.

*B60Q 1/14* (2006.01)
*B60Q 1/08* (2006.01)
*H05B 47/115* (2020.01)

(52) U.S. Cl.

CPC ............. *B60Q 1/1423* (2013.01); *B60Q 1/08* (2013.01); *H05B 47/115* (2020.01); *B60Q 2300/056* (2013.01); *B60Q 2300/324* (2013.01); *B60Q 2300/42* (2013.01)

(58) Field of Classification Search

CPC .. B60Q 1/08; B60Q 1/1423; B60Q 2300/056; B60Q 2300/324; B60Q 2300/42; F21S 41/663; H05B 47/115

USPC ........................ 315/82; 362/465, 466; 701/36

See application file for complete search history.

(56) References Cited

U.S. PATENT DOCUMENTS

| | | | |
|---|---|---|---|
| 6,049,171 A | 4/2000 | Stam et al. | |
| 11,427,122 B2 * | 8/2022 | Kaino | B60Q 1/0023 |
| 12,222,079 B2 * | 2/2025 | Brunner | B60Q 1/085 |
| 12,522,129 B2 * | 1/2026 | Otsuka | B60Q 1/1423 |
| 2003/0137849 A1 * | 7/2003 | Alden | B60Q 1/085 362/276 |
| 2012/0123638 A1 | 5/2012 | Bechtel et al. | |
| 2013/0218413 A1 * | 8/2013 | Tanaka | B60Q 1/143 701/36 |
| 2021/0162912 A1 | 6/2021 | Spero | |

* cited by examiner

*Primary Examiner* — Keith G. Delahoussaye

(74) *Attorney, Agent, or Firm* — Young Basile Hanlon & MacFarlane. P.C.

(57) ABSTRACT

A method for reducing headlight glare from a first vehicle comprising a first headlight and one or more sensors. The method includes illuminating, by the first headlight in a low beam setting, a portion of a road that the first vehicle is traveling along. The one or more sensors may detect a presence of a second vehicle. For example, the one or more sensors may detect the presence of the second vehicle in a region that is receiving direct glare from the first headlight in the low beam setting. The first headlight may dim, in response to the detecting, to a first light output below the low beam setting.

20 Claims, 14 Drawing Sheets

LOW BEAM DIMMING METHOD FOR SITUATIONAL GLARE

TECHNICAL FIELD

This disclosure relates generally to controlling a headlight of a vehicle, and more particularly to dimming the light output of a headlight while the vehicle is active in a low beam setting.

BACKGROUND

Glare experienced by oncoming vehicles impacts safety on the road. For example, headlight glare may reduce visibility for the drivers of oncoming vehicles. By minimizing headlight glare, road safety improves for all drivers. Therefore, there is a need to reduce headlight glare.

SUMMARY

This disclosure relates to a light system of a first vehicle and a method for dimming a first headlight of the light system. In addition to the light system and the first headlight thereof, the first vehicle may comprise one or more sensors. The one or more sensors may be forward facing with respect to the first vehicle. The vehicle may further comprise one or more processors running software configured to control the first headlight.

The method may include providing light from the first vehicle. The method may further include illuminating, by the first headlight in a low beam setting, a portion of a road that the first vehicle is traveling along. The method may include detecting a presence of a second vehicle with the one or more sensors, which the first vehicle is active with the low beam setting. The method may include dimming, in response to the detecting, the first headlight to a first light output below the low beam setting. The dimming may include dimming the low beam light source of the first headlight, wherein the first headlight may include a low beam light source corresponding to the low beam setting.

The first vehicle may include a glare zone corresponding to the low beam setting. The glare zone may correspond to a geometric plane that defines a threshold for the glare zone. The method may include using the one or more sensors to detect a presence of the second vehicle in the glare zone. The detecting may include using the one or more sensors to detect light emanating from the second vehicle. The detecting may include detecting the presence of the second vehicle in a glare zone corresponding to the low beam setting.

The method may include detecting, after the dimming, an absence of the second vehicle in the glare zone. The method may include undimming the first headlight in response to the detecting of the absence of the second vehicle. The method may include detecting, after the dimming, an absence of light emitted by the second vehicle in the glare zone. The method may include undimming the first headlight in response to the detecting the absence of the light emitted by the second vehicle.

The dimming may comprise controlling, while the second vehicle is in the glare zone corresponding to the low beam setting, the light output of one headlight using the software. The light output may be at or above 500 lumens. The dimming may further comprise controlling the output of the first light of the first headlight output using the control system when the first headlight is positioned on a first side of the vehicle and a second headlight is positioned on a second side of the vehicle.

The method may further comprise that the first vehicle travels in a first lane of the road in a first direction and the second vehicle travels on a second lane of the road in a second direction towards the first vehicle. The dimming may further comprise controlling the light output using the control system such that the light output from the first headlight is changed and the light output from a second headlight of the vehicle is unchanged. The dimming may further comprise dimming an entire low beam pattern of the first headlight. The dimming may further comprise controlling, while the second vehicle is in a glare zone corresponding to the low beam setting, the first light output of the first headlight using the control system and a second light output from a second headlight of the vehicle is unchanged.

A system for dimming a headlight may comprise a processing system and a memory operably connected to the processing system and storing instructions. The instructions may, when executed, cause the processing system to detect, while in a low beam setting, a presence of a second vehicle. The instructions may cause the processing system to dim, in response to the detecting of the presence of the second vehicle, a headlight to a light output below the low beam setting. The instructions may define a threshold of a glare zone corresponding to the low beam setting. The detecting may comprise detecting the presence of the second vehicle in the glare zone. The instructions, when executed, may further cause the processing system to detect, after the dimming, an absence of the second vehicle. The instructions, when executed, may further cause the processing system to increase the light output to the low beam setting in response to the detecting the absence of the second vehicle.

The foregoing elements and features can be combined in various combinations without exclusivity, unless expressly indicated otherwise. These elements and features, as well as the operation thereof, will become more apparent in view of the following detailed description with accompanying drawings. It should be understood that the following detailed description and accompanying drawings are intended to be exemplary in nature and non-limiting.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
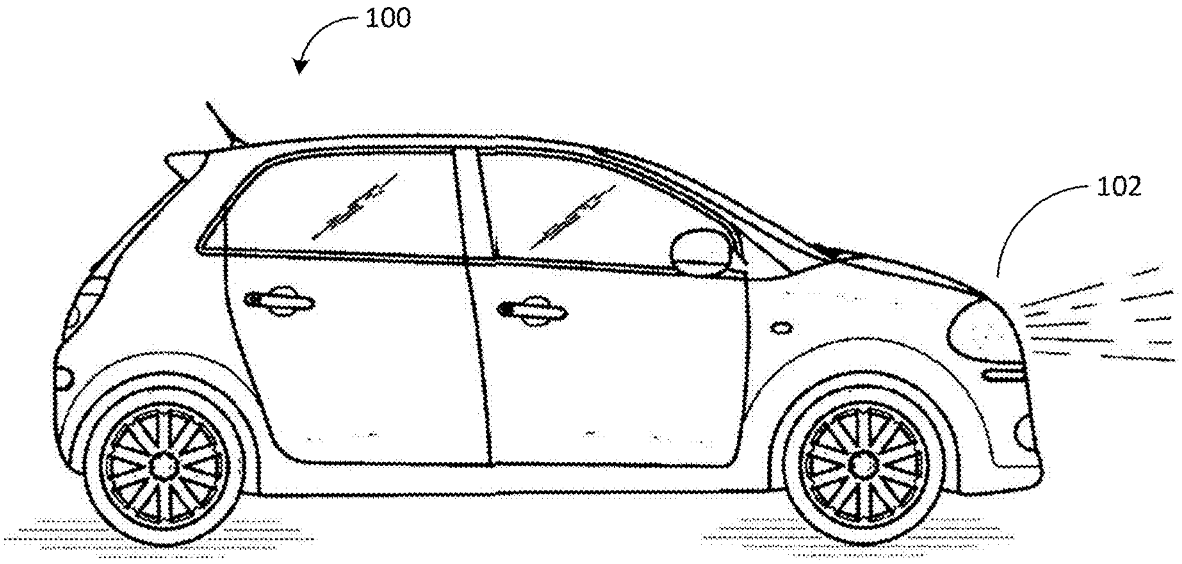
FIG. 1 is a side view of a first vehicle.

FIG. 1 illustrates a side view of a first vehicle. The first vehicle 100 may incorporate a light system 102. The light system 102 may include headlights, brake lights, turn signals, and other lighting components. This light system 102 may play a role in enhancing the overall functionality, safety, and design aesthetics of the first vehicle 100. For example, the light system 102 may provide visibility during nighttime driving or in adverse weather conditions, including fog, rain, or snow. By illuminating the road, the light system 102 may aid the driver in navigating safely and in detecting and avoiding potential obstacles, such as pedestrians, animals, other vehicles, or a combination thereof. Furthermore, the light system 102 may be engineered to comply with safety standards that regulate automotive lighting, ensuring that it meets visibility and signaling requirements while minimizing glare for other road users.

The light system 102 may support various lighting functions, including signaling, low beam, high beam, or a combination thereof. The shape, configuration, and placement of the light system 102 or components thereof may be crafted to provide optimal illumination and visibility. This may involve adjustments in light intensity and dispersion to illuminate the road ahead while preventing glare that could impair the vision of oncoming drivers. Achieving this may involve controlling beam angles, light patterns, and dispersion, ensuring compliance with safety regulations while also enhancing the overall aesthetic of the first vehicle 100. Thus, the light system 102 may represent an intersection of technology, safety, and design, contributing to both the functional performance and visual identity of the first vehicle 100.

Figure 2:
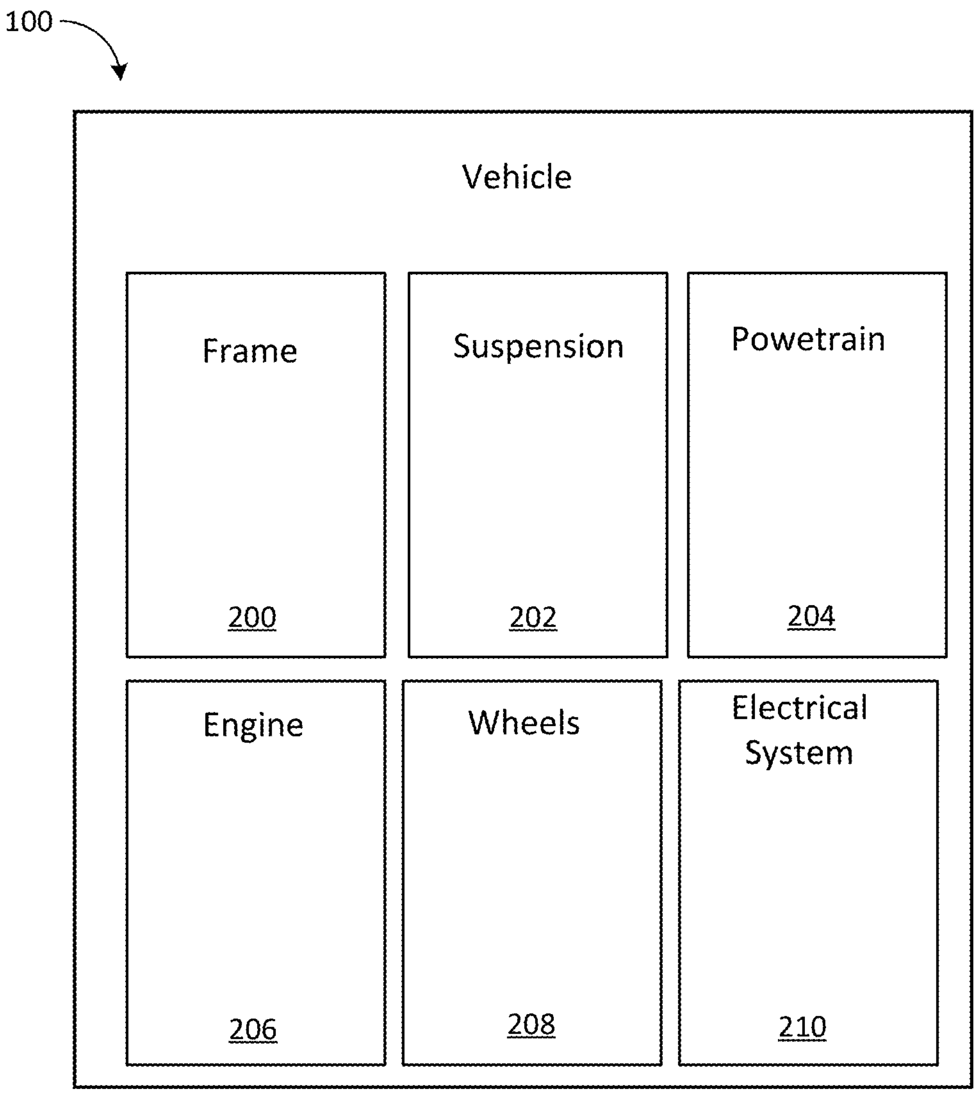
FIG. 2 is a box diagram of the first vehicle of FIG. 1.

FIG. 2 illustrates various systems of the first vehicle 100. The first vehicle 100 may include a frame 200, suspension system 202, a powertrain 204, engine 206, wheels 208, and an electrical system 210. The frame 200 of the first vehicle 100 may provide structural support for and/or house systems such as the powertrain 204 and suspension system 202. The frame 200 may contribute to the proper alignment of lights and mirrors, helping to reduce glare by keeping these components in their correct positions. The frame 200 may be designed with aerodynamics in mind, which may help to minimize glare-inducing reflections on the windshield from external light sources, thus improving driving safety and comfort.

The suspension system 202 may include components such as, but not limited to, shocks, springs, struts, or a combination thereof. The suspension system 202 may assist in the stability of the first vehicle 100 by absorbing forces (e.g., road impacts, vibrations, or the like). The stability may keep headlights (i.e., the light system 102) properly aligned, as the suspension system 202 may prevent the lights from moving (e.g., tilting upward or downward) excessively and causing unwanted or unnecessary glare.

The powertrain 204, which may include the engine 206, may be primarily responsible for moving the first vehicle 100 efficiently. Additionally, the powertrain 204 may provide energy for powering other systems (e.g., the electrical system 210).

The wheels 208 may enable smooth movement by reducing friction between the first vehicle 100 and the surface (e.g., the road 500) the first vehicle 100 travels on. The wheels 208 may rotate around an axle, allowing the first vehicle 100 to roll forward or backward. This rotational motion may allow the wheels 208 to grip the road, providing traction for operations (e.g., acceleration, braking, steering, or a combination thereof) of the first vehicle 100.

The electrical system 210 of the first vehicle 100 may power components such as lighting, sensors, and driver assistance features. Thus, the light system 102 may form part of the electrical system 210 of the first vehicle 100. For example, the electrical system 210 may enable automatic dimming of headlights or interior lights that may be controlled by light sensors integrated into the electrical system 210.

Figure 3:
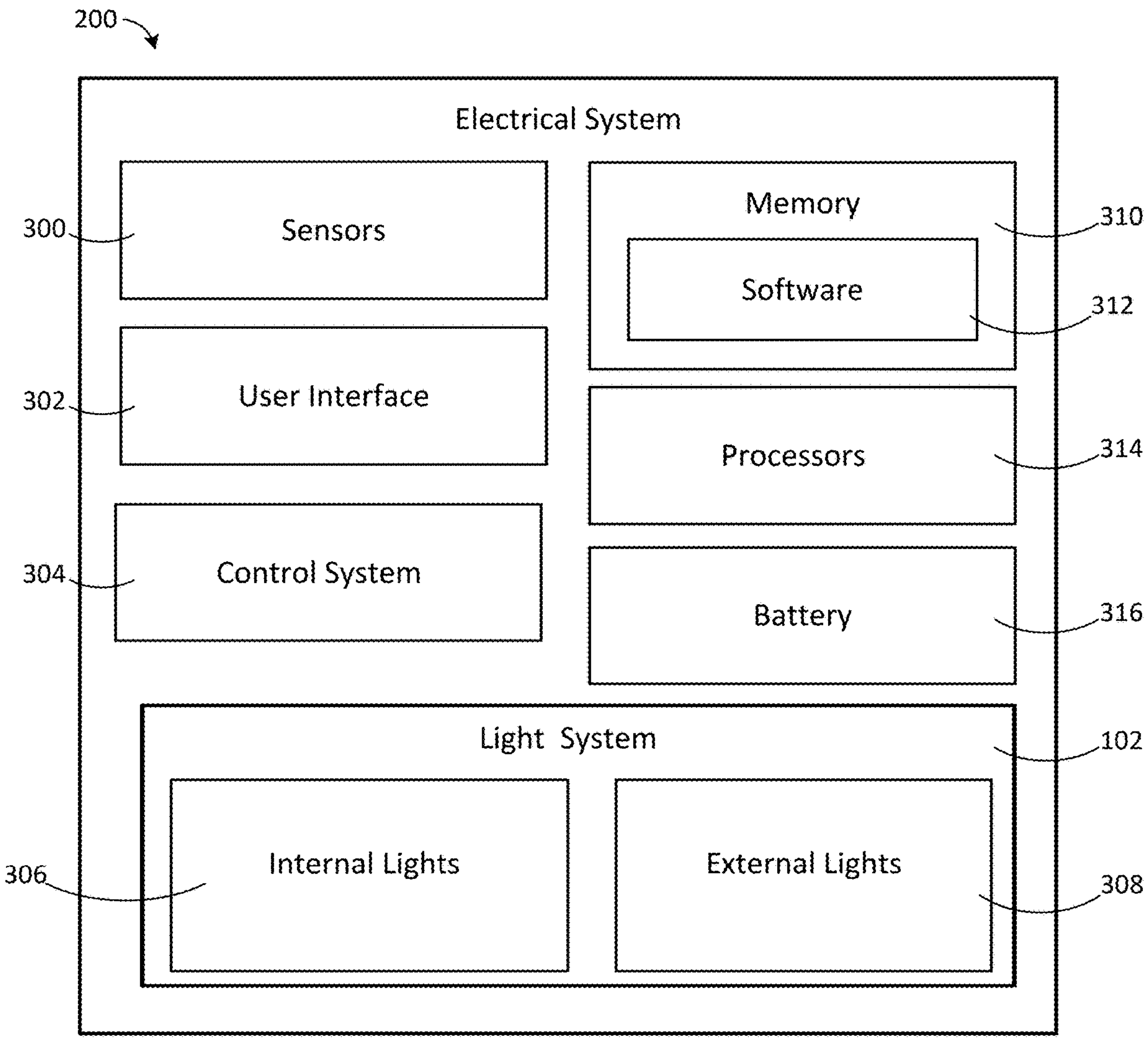
FIG. 3 is a box diagram of the electrical system of the first vehicle.

FIG. 3 illustrates a box diagram of the electrical system 210 of the first vehicle 100. The electrical system 210 may include one or more sensors 300, a user interface 302, a control system 304, memory 310, one or more processors 314, one or more batteries 316, and a light system 102.

The first vehicle 100 may be equipped with a range of sensors 300 that may monitor and/or support the performance of various vehicle functions (e.g., light system). The sensor may detect speed, proximity positioning, or the like. The sensors 300 may be or include cameras, radar transmitters and/or receivers, LiDAR transmitters and/or receivers, ultrasonic transmitters and/or receivers, optical sensors, magnetic sensors, or a combination thereof. The sensors 300 may provide real-time data that may be used to control other systems (e.g., the light system 102) of the first vehicle 100. For example, the sensors 300 may include one or more proximity sensors. The proximity sensors may detect objects around the first vehicle.

The sensors 300 may include one or more light sensors. The light sensor may be located on the front of the first vehicle 100. The light sensors may detect the headlights of oncoming vehicles or the taillights of vehicles traveling in the same direction. When the light sensors detect these lights (i.e., headlights or taillights of other vehicles), the control system 304, operating under the direction of one or more processors 314 running software 312 stored in memory 310, may dim one or more headlights of the first vehicle 100, thereby reducing the risk of adverse effects imposed on the other drivers. Once the oncoming vehicle passes or the road ahead clears, the control system 304 may restore the one or more headlights to their previous settings (e.g., full low beam power) without requiring driver intervention.

The user interface 302 of the first vehicle 100 may include controls, displays, and input mechanisms that a driver may use to interact with the first vehicle 100. The user interface 302 may be a touchscreen display that serves as the primary control hub for features such navigation, climate control, audio, connectivity options, or a combination thereof. The user interface 302 may show real-time information from sensors 300, such as proximity warnings or backup camera feeds, and can integrate with smartphone interfaces for seamless access to apps and media. The user interface 302 may include voice recognition, enabling hands-free control over functions (e.g., volume, temperature, etc.).

The user interface 302 may include buttons, knobs, dials, levers, or a combination thereof that controls various functions of a first vehicle (e.g., volume, temperature, etc.). For example, climate control may be managed through rotary knobs or sliders, allowing the driver to adjust temperature, fan speed, airflow direction, etc. The audio system may use physical buttons and a volume dial to control functions like tuning the radio, changing tracks, or adjusting volume.

The user interface 302 may enable a driver to selectively reduce glare for oncoming vehicles by providing controls and automated features that manage the headlights of the first vehicle 100. The user interface 302 may provide physical or digital controls that enable the driver to manually toggle between different light modes. The user interface 302 may have an option to adjust the intensity, brightness, or a combination thereof of the headlights.

The control system 304 may implement various functions (e.g., tire pressure monitoring, electric system monitoring, light control, braking systems, etc.) of a first vehicle 100. For example, the control system 304 may use data from the sensors 300 to measure the distance to a vehicle in front, allowing the control system 304 to adjust speed to maintain a safe following distance. The control system 304 may use data from the sensors 300 to determine the position, angle, or a combination thereof of the first vehicle 100. The control system 304 may operate under the direction of one or more processors 314 running software 312 stored in memory 310. Alternatively, the control system 304 may operate at least partially independent of the one or more processors 314.

The control system 304 may reduce glare for oncoming vehicles by managing the light system 102 (e.g., one or more headlights) through dimming the output of the light system to a light output less than the low beam (e.g., from about 700 lumens to about 500 lumens). The control system 304 may integrate sensors 300, automation (e.g., act on decisions or commands originating from the one or more processors 314), and user inputs to the user interface 302 to adjust lighting in real-time. The control system 304 may automatically reduce the output of the light system 102 to reduce glare experienced by drivers of other vehicles. For example, once an oncoming vehicle passes the first vehicle 100, the control system 304 may increase the output of the light system 102 to ensure visibility for the driver without causing glare to other drivers. This automatic feature may reduce the likelihood of a driver forgetting to manually dim the headlights.

The control system may dim the light output using pulse-width modulation (PWM), where a current supplied to the light system is rapidly switched on and off at varying intervals to control the perceived brightness without affecting the overall performance of the light system The control system may dim the light output using voltage regulation, where the control system reduces the voltage delivered to the light system, decreasing the intensity of the light output. For systems using light emitting diodes (LEDs), the control system may dim specific segments or pixels within a matrix configuration by selectively deactivating or lowering the power supplied to individual LEDs. The control system may dim the light output using in a High-Intensity Discharge (HID) system, the ballast can be adjusted to control the intensity of the arc within the bulb. The control system may dim the light output using an adaptive lighting approach, where the control system may dynamically adjust the dimming based on real-time inputs such as ambient light levels, oncoming traffic, or driving speed. These dimming techniques can be used individually or in combination. That is, to dim the light output of light system 102, the control system may utilize both adaptive lighting and voltage regulation.

For example, the first headlight (e.g., light system 102) may be set to a low beam setting. The control system may automatically reduce the output of the light system 102 from the low beam (e.g., approximately 700 lumens) to an output less than the low beam (e.g., approximately 500 lumens). Once an oncoming vehicle passes the first vehicle 100, the control system 304 may increase the output of the light system 102 to ensure visibility for the driver without causing glare to other drivers.

The memory 310 may store operational data. The memory 310 may allow the first vehicle 100 to respond to various inputs and conditions. The memory 310 may allow for real-time data processing by the one or more processors 314. The memory 310 may also store the software 312 comprising one or more instructions for monitoring and controlling different systems (e.g., electrical system 210, light system 102, etc.) of the first vehicle 100.

For example, the memory 310 may store settings for headlight sensitivity. The settings may allow the control system 304 to change the light output from the headlights accurately to varying traffic and/or environmental conditions to reduce the chance of glare for oncoming vehicles.

The software 312 may process and/or use the data from the sensors 300. The software 312 may execute algorithms that control the first vehicle 100. For example, the software 312 may have instructions to brake when the first vehicle 100 detects an obstacle using sensors 300. The software 312 may have instructions to turn on the light system 102 (e.g., one or more headlights) when the sensors 300 detect that the first vehicle 100 is in a dark environment (e.g., nighttime, under a bridge, in a tunnel, parking garage, or the like).

The software 312 may be programed such that the control system 304 automatically dims the headlights (i.e., the light system 102) to prevent glare for the oncoming driver when the sensors 300 detect an oncoming vehicle. Once the oncoming vehicle passes, the software 312 may be programmed to have the control system 304 increase the light output of the headlights (i.e., the light system 102) or otherwise return the headlights to a normal operation condition.

The first vehicle may include one or more processors 314. One or more processors 314 may execute the software 312 and manage the functions of the first vehicle 100 (e.g., tire pressure monitoring, electric system monitoring, light control, braking systems, etc.). One or more processors 314 may handle real-time data processing, control algorithms, and communication between different vehicle systems (e.g., light system 102, control system 304, etc.). For example, one or more processors 314 may manage audio, video, navigation, and connectivity functions of the user interface 302.

One or more processors 314 may receive and analyze data from the sensors 300. When one or more processors 314 receives data that identifies the lights (e.g., headlights, taillights, etc.) of other vehicles, one or more processors may process this data and signal to the control system 304 to reduce the light output of the light system 102. Once the sensors 300 determine that the oncoming vehicle has passed or the conditions no longer require reducing the light output, one or more processors 314 may process this information from the sensors 300 and signal to the control system 304 to increase the light output of the light system 102.

The electrical system 210 may include a battery 316. The battery 316 may provide a source of electrical energy. The battery 316 may provide the initial electrical power needed to start the engine 206. The battery 316 may also supply electricity to systems such as the light system 102, user interface 302, control system 304, or a combination thereof. The battery 316 may power an electric motor, enabling propulsion. The battery 316 may be capable of delivering energy to drive the first vehicle 100 while simultaneously supporting auxiliary functions (e.g., the user interface 302).

For example, the battery 316 may supply consistent energy to the sensors 300 and control system 304 enabling the sensors 300 and control system 304 to function in low-power situations. For example, when the sensors 300 detect the headlights of an oncoming vehicle, the control system 304 may use power from the battery 316 to reduce the output of the light system 102. This dimming process may reduce glare for the oncoming driver. The battery 316 may ensure that this function during extended use of one or more headlights (i.e., the light system 102) or other components of the electrical system 210.

The light system 102 may provide visibility, safety, or a combination thereof for the first vehicle 100. That is, the light system 102 may allow the driver of the first vehicle 100 the ability to see the road during various driving conditions (e.g., nighttime, snow, rain, fog) and/or to be seen by others on the road. The light system 102 may include internal lights 306 and external lights 308.

The light system 102 may house an array of small, individually controllable modules arranged (e.g., light emitting diodes) in a grid or linear pattern. The light system 102 may use the sensors 300 to detect oncoming vehicles, surrounding traffic, and road conditions. Using this input, the light system 102 may selectively dim or deactivate modules to create a glare-free zone, preventing glare from affecting oncoming drivers while maintaining illumination of the surrounding road.

For example, the light system 102 may be a matrix system. The matrix system may be an array of nine light-emitting segments arranged in a three-by-three grid, where each segment is independently controllable to adjust the light output. operating under the direction of the one or more processors 314, may selectively dim or deactivate specific segments in response to detected conditions, such as the presence of oncoming vehicles. When a vehicle is detected in the line of sight, the control system may deactivate or dim three segments in a column of the grid to create a shadowed area, ensuring no glare is cast toward the other driver. Simultaneously, the remaining six segments, arranged in a two by three configuration, maintain full power output to provide consistent illumination of the surrounding road and environment.

The internal lights 306 in a first vehicle 100 may serve both functional and aesthetic purposes, enhancing the driving experience by providing illumination inside the first vehicle 100. The internal lights 306 may help the driver and passengers see inside the first vehicle 100. The internal lights 306 may be, but are not limited to, dome lights, reading lights, footwell lights, door courtesy lights, glove box lights, cargo area lights, or a combination thereof.

The external lights 308 may assist with safety, visibility, communication, and signaling to other road users. These lights help drivers see the road and surroundings in low-light conditions, alert others to the presence and intentions of the first vehicle 100 and enhance overall driving safety. External lights 308 may include, but are not limited to, headlights, daytime running lights, fog lights, turn signal indicators, brake lights, or a combination thereof. The external lights 308 may allow the driver of the first vehicle 100 the ability to see the road during various driving conditions (e.g., nighttime, snow, rain, fog) and/or to be seen by others on the road.

Figure 4:
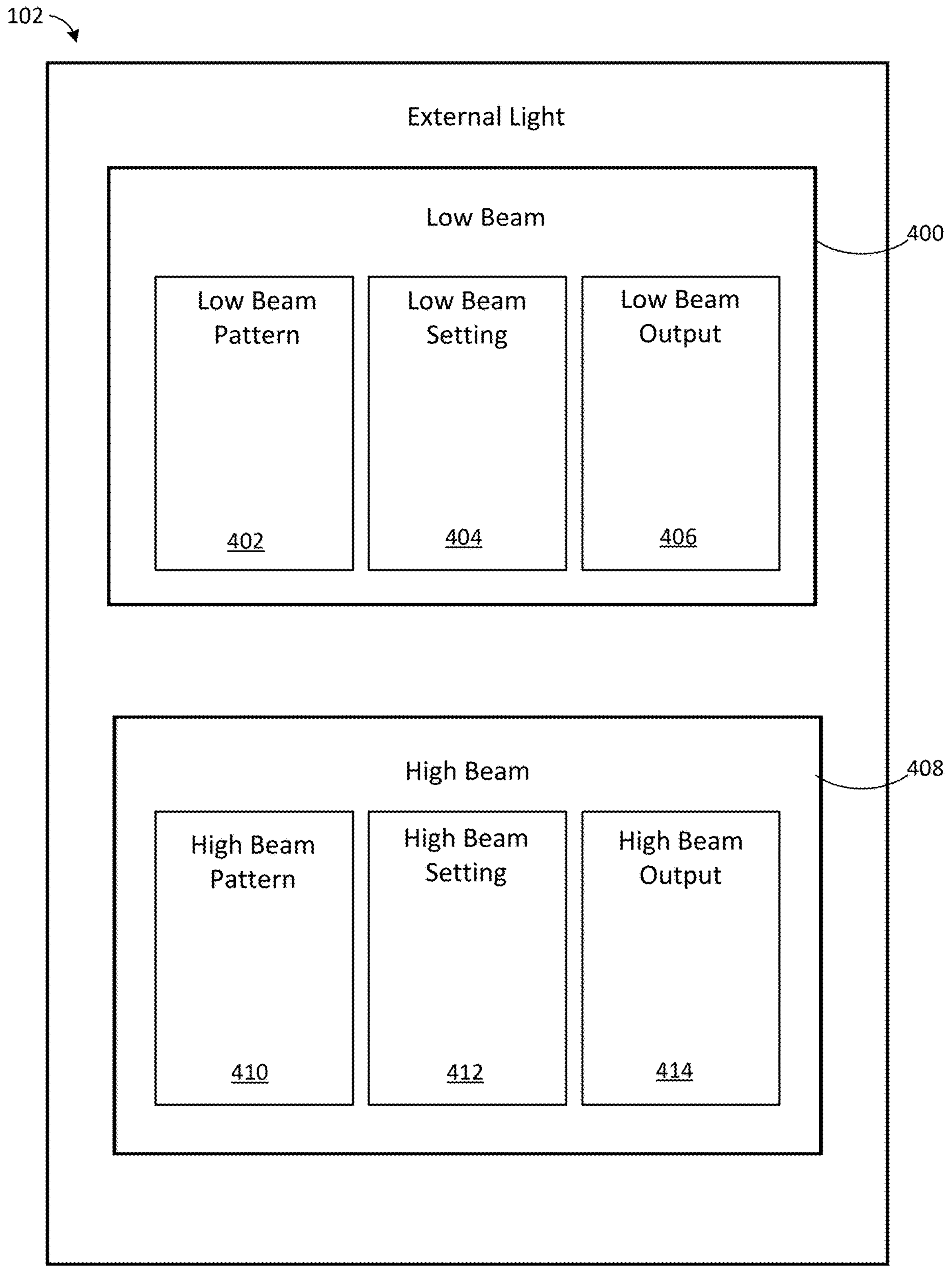
FIG. 4 is a box diagram of the light system of the first vehicle.

FIG. 4 is a box diagram of the external lights 308. The external lights 308 (e.g., one or more headlights) may include a low beam 400 and a high beam 408. The low beam 400 may include a low beam pattern 402, a low beam setting 404, and a low beam output 406 (i.e., the first light output). The high beam 408 may include a high beam pattern 410, a high beam setting 412, and a high beam output 414.

The low beam 400 may be used when other vehicles are present (e.g., highways, city streets, back roads, etc.). The low beam pattern 402 may be designed to project light closer to the first vehicle 100. The low beam pattern 402 may project light in a downward direction relative to the first vehicle 100. This may ensure that the low beam output 406 extends approximately forty to sixty meters (i.e., approximately one-hundred and thirty to two-hundred feet) away from the first vehicle 100. The low beam setting 404 may be manually engaged using the user interface 302 or automatically activated by the control system 304 operating under the direction of one or more processors 314 running software 312 stored in memory 310.

The low beam pattern 402 may include singular light source or be arranged in a matrix pattern. The matrix system may be an array of nine light-emitting segments arranged in a three-by-three grid, where each segment is independently controllable to adjust the low beam output 406. The control system, operating under the direction of the one or more processors 314, may selectively dim or deactivate specific segments in response to detected conditions, such as the presence of oncoming vehicles. When a vehicle is detected in the line of sight, the control system may deactivate or dim three segments in a column of the grid to create a shadowed area, ensuring no glare is cast toward the other driver. Simultaneously, the remaining six segments, arranged in a two by three configuration, maintain full power output to provide consistent illumination of the surrounding road and environment.

The control system, operating under the direction of the one or more processors 314, may selectively dim all nine segments simultaneously in response to specific environmental or operational conditions. The control system may reduce the light output of the entire grid to decrease glare while maintaining sufficient illumination for safe driving. The control system may reduce the light output to a light output less than the low beam output.

The low beam output 406 may have a low intensity. The low intensity may depend on the type of light source and/or bulb (e.g., halogen, high-intensity discharge, light emitting diode, laser, etc.) For example, the intensity of the low beam output 406 may range from approximately seven hundred (700) lumens to one-thousand and two hundred (1200) lumens in a halogen bulb. The intensity of the low beam output 406 may range from approximately 2,000 lumens to 3,500 lumens in a High-Intensity Discharge headlight. The intensity of the low beam output 406 may range from approximately 1,600 lumens to 2,500 lumens in a light emitting diode. The intensity of the low beam output 406 may range from approximately 3,500 lumens or more in a laser headlight.

When the low beam 400 is in the low beam setting 404, the headlight (e.g. external light 308) may use the entire low beam pattern 402 to produce the low beam output 406. The low beam setting 404 may allow the driver to illuminate the road with less risk of glare to oncoming vehicles. For example, the sensors 300 may detect the presence of an oncoming vehicle while the first headlight (e.g., light system 102) is operating in the low beam setting outputting the low beam output 406 of approximately 1200 lumens. The control system 304 operating under the direction of one or more processors 314 may reduce the light output by approximately 300 lumens. The resulting output would be approximately 900 lumens, which is less than the low beam output of 1200 lumens. The low beam output may be reduced by any number of lumens (e.g., 100 lumens, 300 lumens, 700 lumens) as long as the resulting output is at or above the legal minimum (i.e., approximately 500 lumens).

The high beam 408 may be used in situations where high illumination is required (e.g., situations with little traffic, rural roads, or the like). The high beam 408 may project a high beam pattern 410 that spreads the light over a larger distance, covering a broader area in front of the first vehicle 100. The high beam pattern 410 may be controlled through a high beam setting 412 that can be manually engaged using the user interface 302 or automatically activated by the control system 304 operating under the direction of one or more processors 314 running software 312 stored in memory 310. The high beam output 414 may be brighter than the low beam output 406.

The high beam pattern 410 may include singular light source or be arranged in a matrix pattern. The matrix system may be an array of nine light-emitting segments arranged in a three-by-three grid, where each segment is independently controllable to adjust the high beam output 414. The control system, operating under the direction of the one or more processors 314, may selectively dim or deactivate specific segments in response to detected conditions, such as the presence of oncoming vehicles. When a vehicle is detected in the line of sight, the control system may deactivate or dim three segments in a column of the grid to create a shadowed area, ensuring no glare is cast toward the other driver. Simultaneously, the remaining six segments, arranged in a two by three configuration, maintain full power output to provide consistent illumination of the surrounding road and environment.

The high beam output 414 may have a high intensity. The high intensity may depend on the type of light source and/or bulb (e.g., halogen, high-intensity discharge, light emitting diode, laser, etc.) For example, the intensity of the high beam output 414 may range from approximately 1,200 lumens to 1,700 lumens in a halogen bulb. The intensity of the high beam output 414 may range from approximately 3,000 lumens to 3,500 lumens in a High-Intensity Discharge headlight. The intensity of the high beam output 414 may range from approximately 2,000 lumens to 4,000 lumens in a light emitting diode. The intensity of the low beam output 406 may range from approximately 4,000 lumens or more in a laser headlight. When the high beam 408 is in the high beam setting 412, the headlight (e.g. external light 308) may use the entire high beam pattern 410 to produce the high beam output 414. The high beam setting 412 may allow the driver to illuminate the road to see more of the road. The high beam setting 412 may produce more glare for an oncoming driver.

For example, the first headlight (e.g., light system 102) may be in the low beam setting producing a low beam output of approximately 1200 lumens. When the first headlight is in the low beam setting, the high beam is off. The low beam 400 and the high beam 408 may be controlled via a switching mechanism that alternates power delivery exclusively to one beam (i.e., the low beam or the high beam) at a time, ensuring that only the selected beam (i.e., the low beam or the high beam) is active. The low beam selectively dims independently of the high beam. That is, the high beam remains unaffected when the low beam dims or reduces its output, as the two beams are controlled through separate circuits with independent power regulation. For example, the first vehicle 100 may be in the low beam setting. When the sensors 300 detect the presence of an oncoming vehicle, the control system, operating under the direction of the one or more processors 314 may selectively dim the light output to a light output less than the low beam output.

Figure 5:
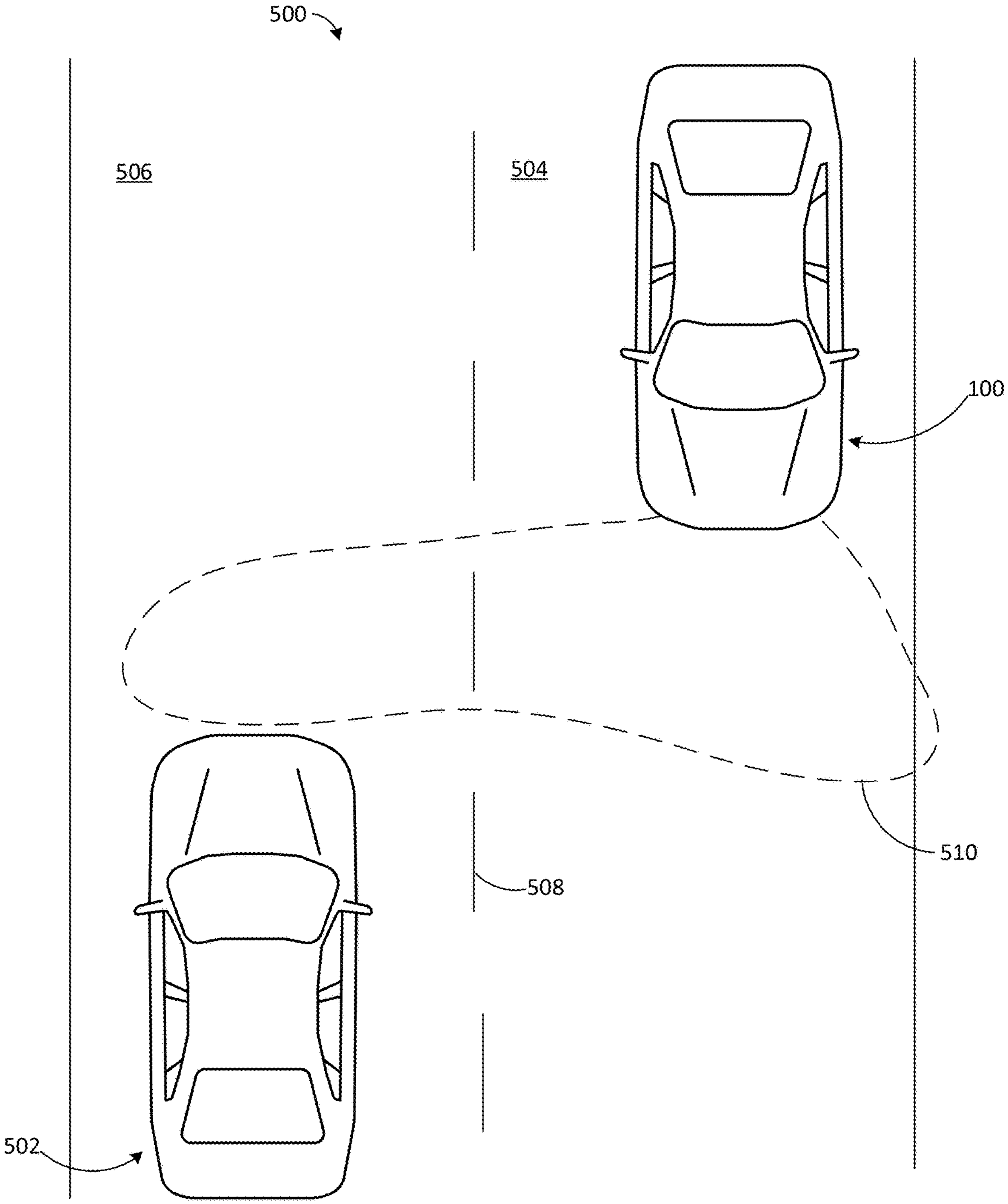
FIG. 5 is a schematic diagram illustrating a top view of the first vehicle and a second vehicle.

FIG. 5 is a schematic illustration of a first vehicle 100 (i.e., a first vehicle 100) and an oncoming vehicle (i.e., a second vehicle 502) traveling on a road 500. The first vehicle may be traveling in a first lane 504 and the second vehicle may be traveling in a second lane. The first lane and the second lane 506 may be separated by centerline 508. The first vehicle 100 may have its headlights on. The headlights may be set to the low beam setting 404. The first vehicle 100 may also have a glare zone 510. The glare zone 510 may correspond to the low beam setting 404.

The glare zone 510 may be defined as a region around, in front, behind, or a combination thereof of the first vehicle 100 where the intensity of light emitted from headlights (e.g., light system 102, external lights 308) or other light sources (e.g., high beams, low beams, tail lights, or auxiliary lights) can cause visual discomfort or temporary vision impairment (e.g., glare) to other drivers, pedestrians, or occupants of the first vehicle 100.

For example, the first vehicle 100 may be a distance (e.g., up to approximately 500 meters and/or the detection range of the sensors 300) away from the second vehicle 502 such that the second vehicle 502 is not within the glare zone 510. The first vehicle 100 and the second vehicle 502 may be traveling toward each other on the road 500. The second vehicle 502 may be approaching the first vehicle 100 such that the headlights of the second vehicle 502 are facing the headlights (e.g., light system 102 and/or external lights 308) of the first vehicle 100. The first vehicle 100 and the second vehicle 502 may be a distance apart such that the first vehicle 100 does not detect the second vehicle 502. The sensors 300 may detect the absence of light emitted from the second vehicle 502 in the glare zone 510 to detect that the second vehicle 502 is not within the glare zone 510. The first light output (i.e., low beam output 406) may remain unchanged when the second vehicle 502 is not within the glare zone 510.

Figure 6:
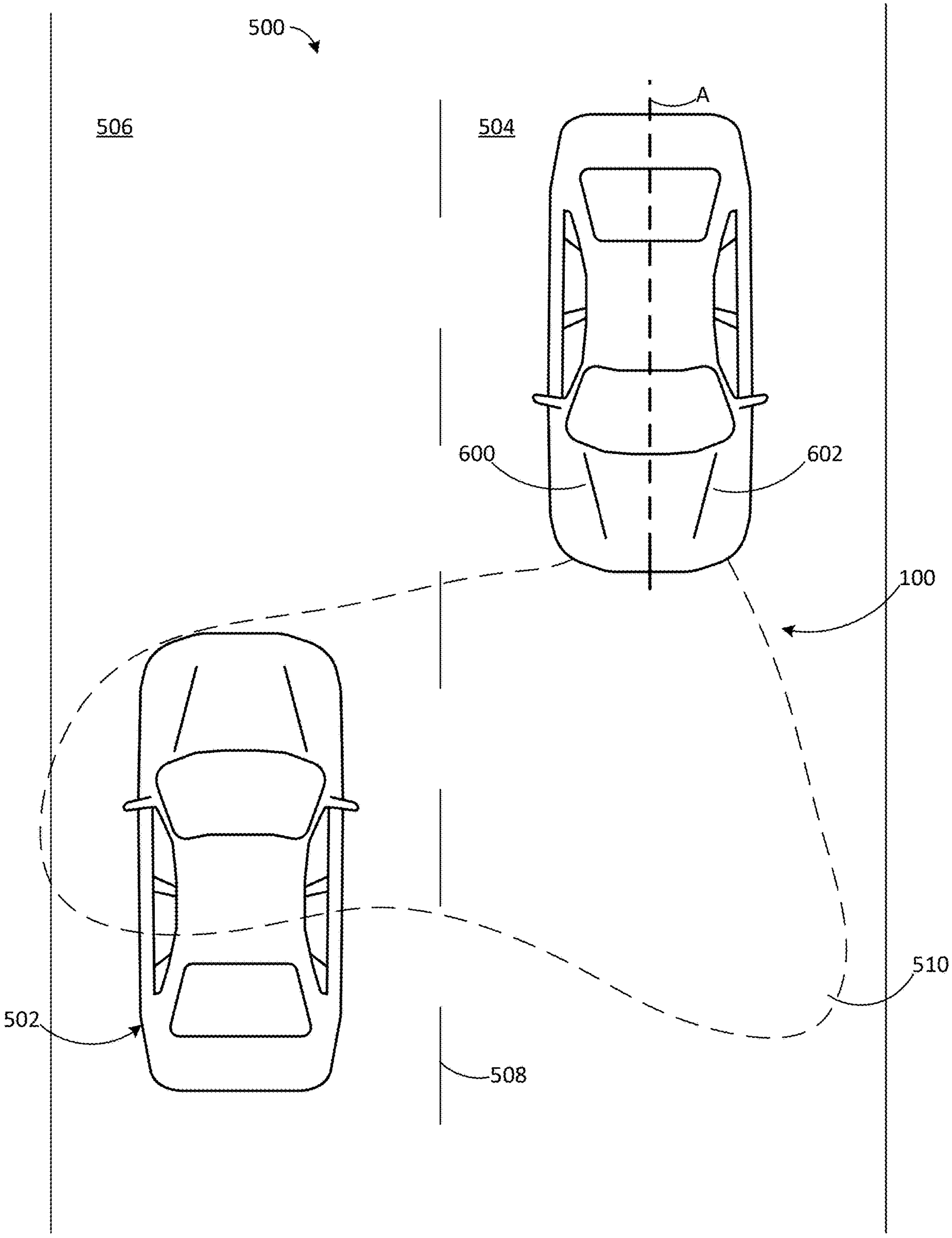
FIG. 6 is a schematic diagram illustrating a top view of the first vehicle and the second vehicle of FIG. 5.

FIG. 6 is a schematic illustration of the first vehicle 100 and an oncoming vehicle (i.e., a second vehicle 502) traveling along a road 500. The first vehicle 100 and the second vehicle 502 may be separated by a centerline 508. The first vehicle 100 may have its headlights (e.g., light system 102, external lights 308) on. The headlights may be in the low beam setting 404. The headlights may include a first headlight and a second headlight. The first vehicle 100 may also have a glare zone 510. The glare zone 510 may correspond to the low beam setting 404. The first vehicle 100 may be a distance (e.g., less than approximately 500 meters and/or the detection range of the sensors 300) away from the second vehicle 502 such that the second vehicle 502 is within the glare zone 510. The sensors 300 may detect the presence of the second vehicle 502 within the glare zone 510. The sensors 300 may detect the presence of light from the second vehicle 502 to determine that the second vehicle 502 is within the glare zone 510. The first vehicle may also have a first side 600 and a second side 602. Line A illustrates the separation of the first side and the second side in the schematic. The first side may correspond to a driver's side of the vehicle. The second side may correspond to the passenger side of the vehicle. The first headlight (e.g., light system 102) may be positioned on the first side of the vehicle. A second headlight may be positioned on the second side of the vehicle.

For example, the first vehicle 100 and the second vehicle 502 may be traveling toward each other on the road 500. The second vehicle 502 may be approaching the first vehicle 100 such that the headlights of the second vehicle 502 are facing the headlights (e.g., light system 102 and/or external lights 308) of the first vehicle 100. The first vehicle 100 and the second vehicle 502 may be a distance apart such that the sensors 300 of the first vehicle 100 detect the second vehicle 502. At the detection, the light system 102 (e.g., one or more headlights) may dim. The first vehicle 100 may have the headlight (e.g., light system 102, external lights 308) set to the low beam setting 404 while the first vehicle 100 and the second vehicle 502 are traveling towards each other on the road 500. When the first vehicle 100 detects that the second vehicle 502 is within the glare zone 510, the headlight of the first vehicle 100 may reduce the light output to a light output below the low beam output 406. The control system 304 may dim the entire low beam pattern 402 to reduce the light output.

One headlight (i.e., the first headlight) may dim (i.e., have the light output reduced) while the second headlight remains unchanged (i.e., the light does not change from the low beam setting). The headlight that dims may be the headlight closest to the oncoming vehicle. The headlight that dims may be the headlight closest to the centerline 508 on the road 500. That is, the headlight on the first side of the first vehicle 100 may dim. Alternatively, both headlights may dim. The first vehicle 100 may have the headlight (e.g., light system 102 and/or external lights 308) set to the low beam setting 404 while the first vehicle 100 and the second vehicle 502 are traveling towards each other on the road 500. When the first vehicle 100 detects that the second vehicle 502 is within the glare zone 510, the headlight of the first vehicle 100 may reduce the light output to a light output below the low beam output 406. The control system 304 may dim the entire low beam pattern 402 to reduce the light output below the low beam output 406.

Figure 7:
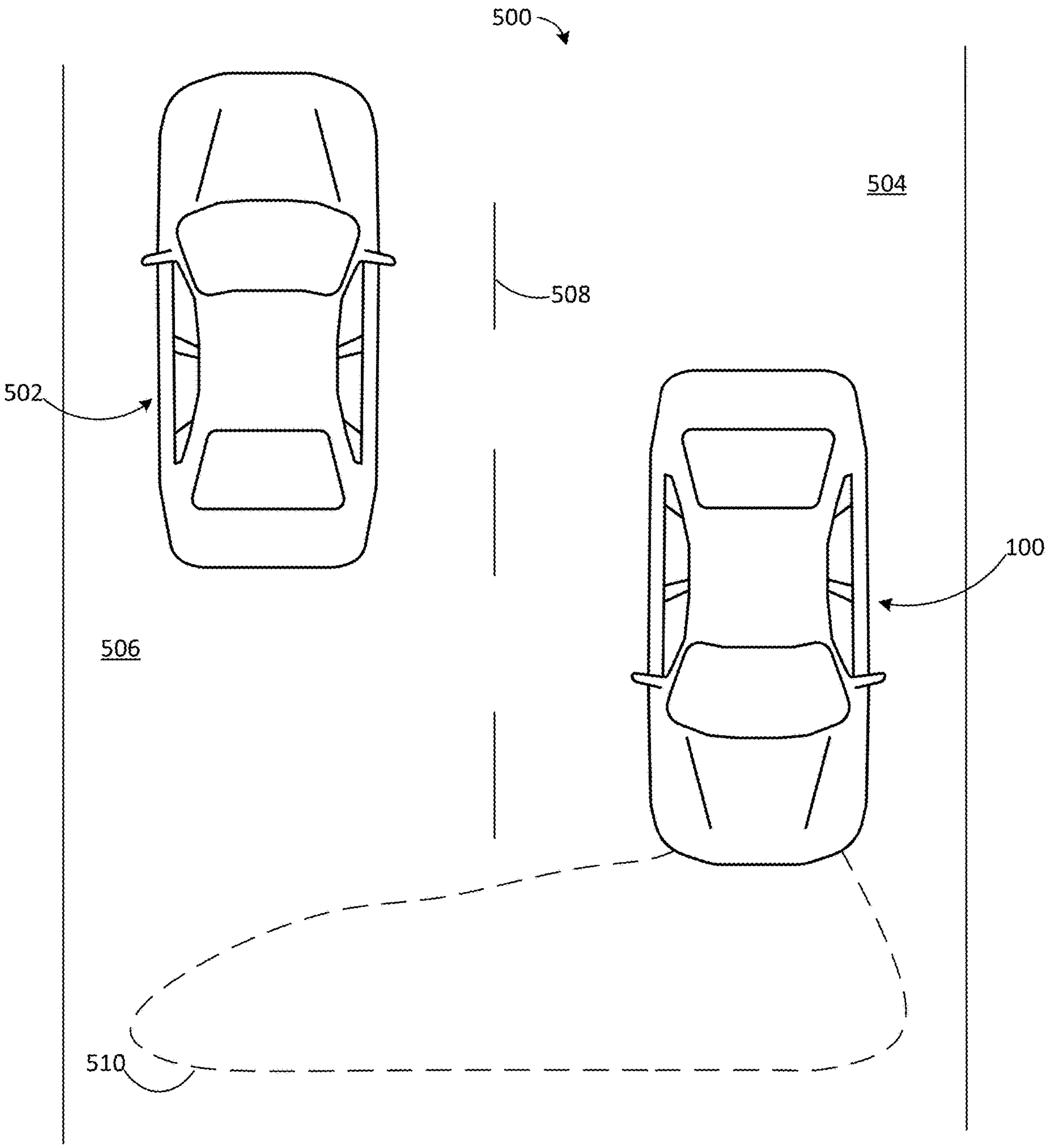
FIG. 7 is a schematic diagram illustrating a top view of the first vehicle and the second vehicle of FIG. 5.

FIG. 7 is a schematic illustration of the first vehicle 100 and an oncoming vehicle (i.e., a second vehicle 502) traveling on a road 500. The first vehicle 100 and the second vehicle 502 may be separated by a centerline 508. The first vehicle 100 may have its headlights on. The headlights may be in the low beam setting 404. The first vehicle 100 and the second vehicle 502 may be traveling away from each other on the road 500. The sensors 300 may detect the absence of light emitted from the second vehicle 502 in the glare zone 510 to detect that the second vehicle 502 is not within the glare zone 510.

For example, the second vehicle 502 may have been within the glare zone 510 of the first vehicle 100 while traveling on the road 500, as illustrated in FIG. 6. After some time, the second vehicle 502 may have passed the first vehicle 100 such that the second vehicle 502 is no longer within the glare zone 510 of the first vehicle 100. When the sensors 300 of the first vehicle 100 no longer detect the second vehicle 502 within the glare zone 510, the headlights may undim. If only one headlight (i.e., the first headlight) positioned on the first side 600 of the first vehicle 100 dimmed, once the second vehicle passes, the first headlight may undim. The light output of the second headlight remains unchanged and in the low beam setting. The sensors 300 may detect an absence of light within the glare zone 510 for one or more processors 314 to determine the second vehicle 502 is no longer within the glare zone 510. The headlights of the first vehicle 100 may return to the low beam output 406 when the second vehicle 502 is no longer within the glare zone 510. The control system 304 may control the whole low beam pattern 402 to return the light output to the low beam output 406.

Figure 8:
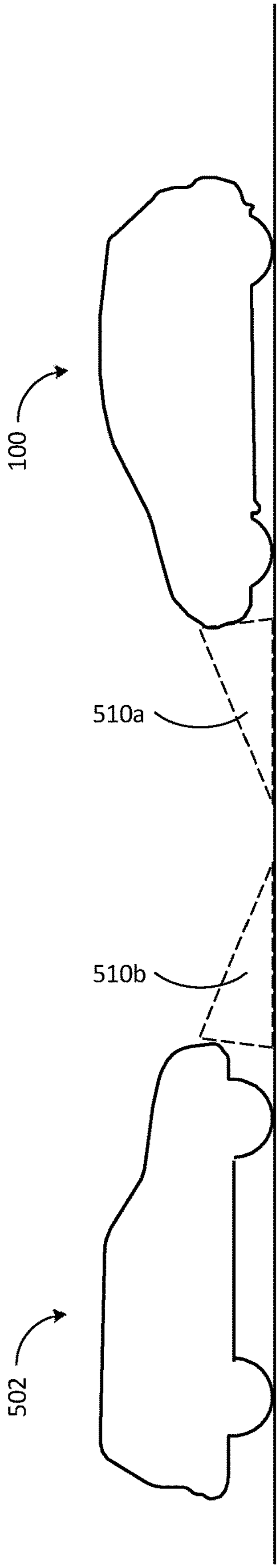
FIG. 8 is a schematic diagram illustrating a side view of the first vehicle and the second vehicle.

FIG. 8 is side schematic view of a first vehicle 100 and a second vehicle 502 traveling on a road 500. The first vehicle 100 may have a first glare zone 510*a*. The second vehicle 502 may have a second glare zone 510*b*.

For example, the first vehicle 100 may be in the low beam setting 404. The second vehicle 502 may be in the low beam setting 404. Both the first vehicle 100 and the second vehicle 502 may be in the low beam setting 404. When second vehicle 502 is not within the first glare zone 510*a*, the light output of the first vehicle 100 may remain unchanged. That is, the light output of the first vehicle 100 may remain at the low beam output 406. Thus, the control system 304 does not dim the light output. When the first vehicle 100 is not within the second glare zone 510*b*, the light output of the second vehicle 502 may remain unchanged. That is, the light output of the second vehicle 502 may remain at the low beam output 406. That is, the control system 304 does not dim the light output.

Figure 9:
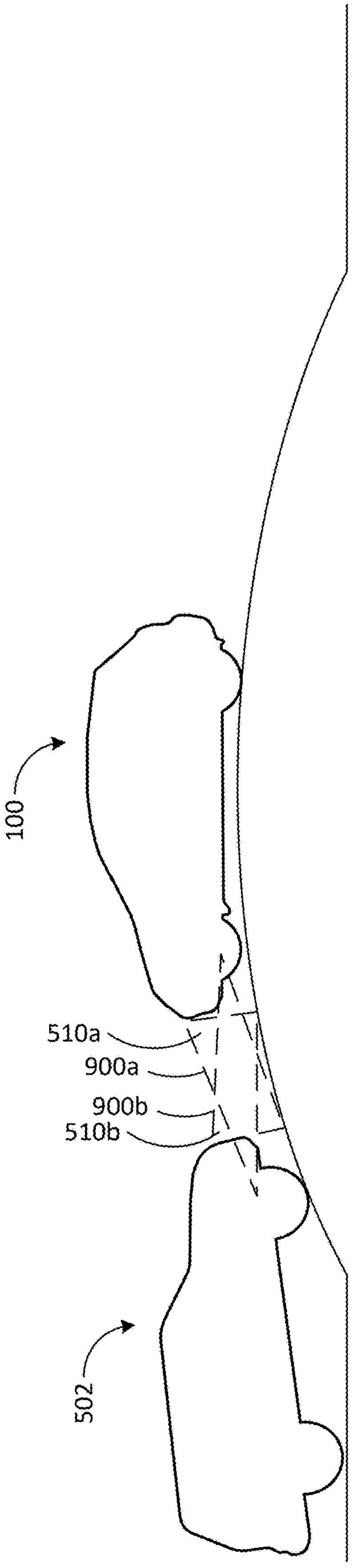
FIG. 9 is a schematic s a schematic diagram illustrating a side view of the first vehicle and the second vehicle on an incline.

FIG. 9 is a side schematic of a first vehicle 100 and a second vehicle 502 on a hill. The first vehicle 100 may be cresting a hill. The first vehicle 100 may be in the low beam setting 404. The first vehicle 100 may be at an angle cresting the hill such that the second vehicle 502 is within the first glare zone 510*a*. The first glare zone 510*a* may correspond to the low beam setting 404. The glare zone may be defined such that objects detected when the first vehicle 100 is on an angle cause the low beam output 406 to dim. The first glare zone 510*a* may correspond to a first plane 900*a* such that if the second vehicle 502 is above that threshold, the lights do not dim. The second vehicle 502 may be driving uphill. The second vehicle 502 may be in the low beam setting 404. The second vehicle 502 may be at an angle going uphill such that the first vehicle 100 is within the second glare zone 510*b*. The second glare zone 510*b* may correspond to the low beam setting 404 of the second vehicle 502. The second glare zone 510*b* may correspond to a second plane 900*b* such that if the second vehicle 502 is above that threshold, the lights do not dim. The first vehicle 100 may dim one or more headlights simultaneously with the second vehicle 502 dimming one or more headlights. The first vehicle 100 may dim one or more headlights independent of whether the second vehicle 502 dims one or more headlights. The second vehicle 502 may dim one or more headlights independent of whether the first vehicle 100 dims one or more headlights.

For example, when the first vehicle 100 is cresting the hill, the headlights (e.g., light system 102, external lights 308) may project straight ahead or slightly upward, scattering light across the road 500. This projection of the light output may create glare for the oncoming vehicle (e.g., second vehicle 502). The light system 102 of the first vehicle 100 may be in the low beam setting 404 while the first vehicle 100 is cresting the hill. The first vehicle 100 may be in the low beam setting 404. The one or more headlights (e.g., light system 102, external lights 308) may produce a light beam output. The second vehicle 502 may be driving uphill while the first vehicle 100 is cresting the hill. When the second vehicle 502 is driving uphill, the second vehicle 502 may enter the glare zone (i.e., the first glare zone 510*a*) of the first vehicle 100. The sensors 300 may detect the presence of the second vehicle 502 in the first glare zone 510*a*. When the sensors 300 detect the presence of the second vehicle 502 in the first glare zone 510*a*, the one or more processors 314 may process instructions from the software 312 such that the control system 304 dims the headlights. The control system 304 may dim one headlight. The control system 304 may dim both headlights. The control system 304 may dim the headlight positioned on the side of the first vehicle 100 where the driver is located. The control system 304 may dim the headlight to a light output below the low beam output 406. The control system 304 may dim the headlight such that there is still an output of light from the headlight (i.e., the headlight will not turn off). The control system 304 may dim the headlight such that the light output is above the legal minimum (e.g., 500 lumens).

When the second vehicle 502 is traveling uphill, the front of the second vehicle 502 may be at an angle. The front of the second vehicle 502 may be tilted upwards relative to the surface of the road 500. This tilting can cause the headlights (e.g., the light system 102, external lights 308) to point higher than the headlights would point would on level ground (e.g., a straight section of the road 500). As a result, the headlights may shine directly into the eyes of drivers in oncoming traffic (e.g., the first vehicle 100 cresting the hill), causing glare. The light system 102 of the second vehicle 502 may be in the low beam setting 404 while the second vehicle 502 is traveling uphill. The one or more headlights (e.g., light system 102, external lights 308) may produce a low beam output 406. The first vehicle 100 may be cresting the hill while the second vehicle 502 is traveling uphill. When the first vehicle 100 is cresting the hill, the first vehicle 100 may enter the glare zone (i.e., the second glare zone 510*b*) of the second vehicle 502. The sensors 300 may detect the presence of the first vehicle 100 in the second glare zone 510*b*. When the sensors 300 detect the presence of the first vehicle 100 in the second glare zone 510*b*, the one or more processors 314 may process instructions from the software 312 such that the control system 304 dims the headlights. The control system 304 may dim one headlight. The control system 304 may dim both headlights. The control system 304 may dim the headlight positioned on the side of the first vehicle 100 where the driver is located. The control system 304 may dim the headlight to a first light output below the low beam output 406. The control system 304 may dim the headlight such that there is still an output of light from the headlight (i.e., the headlight will not turn off). The control system 304 may dim the headlight such that the light output is above the legal minimum (e.g., 500 lumens).

Figure 10:
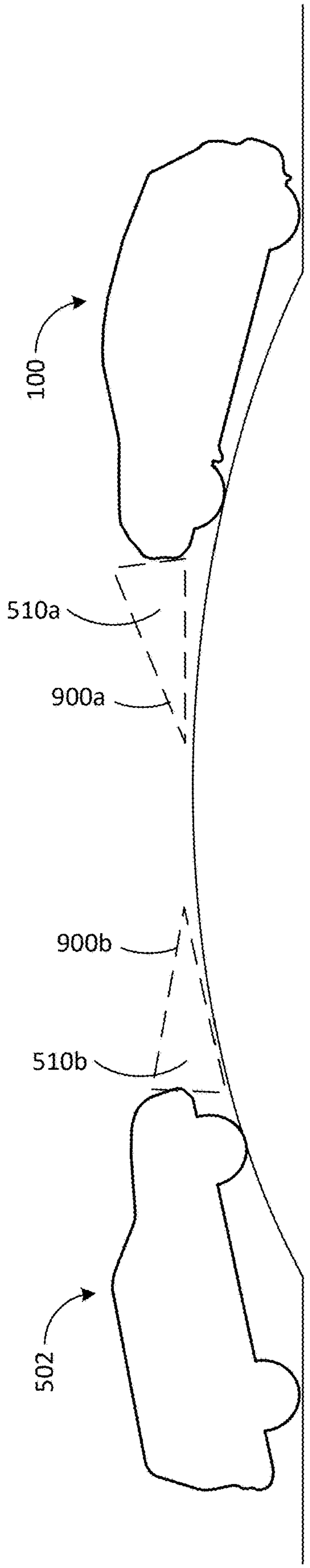
FIG. 10. is a schematic diagram illustrating a side view of the first vehicle and the second vehicle on an incline.

FIG. 10 is a side schematic of a first vehicle 100 and a second vehicle 502 on a hill. The first vehicle 100 travels uphill on one side of the hill approaching the second vehicle 502. The second vehicle 502 may be traveling uphill from the opposite direction, approaching the first vehicle 100. The first vehicle 100 may be out of sight from the second vehicle 502. The second vehicle 502 may be out of sight from the first vehicle 100. As the first vehicle 100 travels uphill, the headlights (e.g., light system 102, external lights 308) may remain directed on the road 500 in front of the first vehicle 100, providing a first light output (e.g., the low beam output, the high beam output 414) for the driver. Before the first vehicle 100 and/or the second vehicle 502 reaches the top of the hill, the second vehicle 502 is not within the first glare zone 510*a* and/or the first vehicle 100 is not within the second glare zone 510*b*.

For example, the first vehicle 100 may be traveling uphill towards the top of the hill. The first vehicle 100 may be approaching the second vehicle 502. The headlight (e.g., light system 102 and/or external lights 308) may be in the low beam setting 404. The first vehicle 100 may be outputting light at the low beam output 406. The first vehicle 100 may have a first glare zone 510*a* corresponding to the low beam setting 404. The sensors 300 of the first vehicle 100 may detect an absence of light in the glare zone. The sensors 300 may detect that the second vehicle 502 is not within the first glare zone 510*a*. One or more processors 314 may process the data from the sensors 300 and communicate to the control system 304 not to dim the first headlight, the second headlight, or a combination thereof the first vehicle 100.

The second vehicle 502 may be traveling uphill towards the top of the hill. The second vehicle 502 may be approaching the first vehicle 100. One or more headlights (e.g., light system 102 and/or external lights 308) may be in the low beam setting 404. The second vehicle 502 may output light at the low beam output 406. The second vehicle 502 may have a second glare zone 510*b* corresponding to the low beam setting 404. The sensors 300 of the second vehicle 502 may detect an absence of light in the second glare zone 510*b*. The sensors 300 may detect that the first vehicle 100 is not within the second glare zone 510*b*. One or more processors 314 may process the data from the sensors 300 and communicate to the control system 304 not to dim the headlights of the second vehicle 502. The first vehicle 100 may not dim one or more headlights independent of whether the second vehicle 502 dims one or more headlights. The second vehicle 502 may not dim one or more headlights independent of whether the first vehicle 100 dims one or more headlights.

Figure 11:
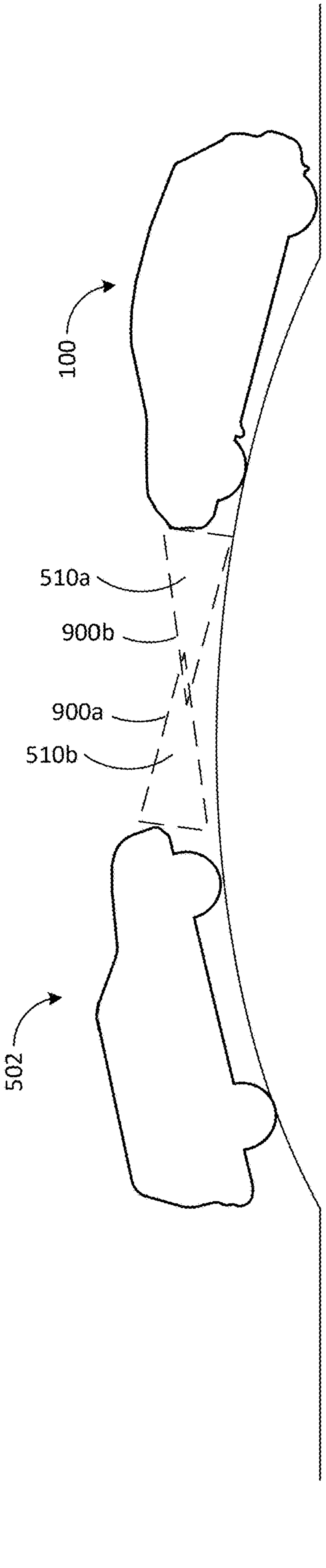
FIG. 11 is a schematic diagram illustrating a side view of the first vehicle and the second vehicle on an incline.

FIG. 11 is a side schematic of a first vehicle 100 and a second vehicle 502 on a hill. The first vehicle 100 may travel uphill on one side of the hill such that the first vehicle 100 may be approaching the second vehicle 502. The headlights (e.g., light system 102 and/or external lights 308) of the first vehicle 100 may tilt upward due to the angle (e.g., incline) of the hill, causing light output (e.g., low beam output 406, high beam output 414) to project farther than the light output would project if the first vehicle 100 is traveling on a surface with little to minimal incline (e.g., a straight section of the road 500). The second vehicle 502 may be traveling uphill from the opposite side of the road 500 approaching the first vehicle 100. The headlights (e.g., light system 102 and/or external lights 308) of the second vehicle 502 may tilt upward due to the angle (e.g., incline) of the hill, causing light output (e.g., low beam output 406, high beam output 414) to project farther than the light output would project if the second vehicle 502 is traveling on a surface with little to minimal incline (e.g., a straight section of the road 500). As first vehicle 100 and the second vehicle 502 approach each other at the top of the hill, the light output from the first vehicle 100 may reach over the top of the hill, potentially causing glare towards the driver of the second vehicle 502. The light output of the headlights of the second vehicle 502 may project into the path of the first vehicle 100 potentially causing glare towards the driver of the first vehicle 100.

For example, the first vehicle 100 may be traveling uphill. The first vehicle 100 may be about to crest the top of the hill. The headlight (e.g., light system 102 and/or external lights 308) of the first vehicle 100 may be in the low beam setting 404. The headlight may output a low beam output 406. The first vehicle 100 may have a first glare zone 510*a* corresponding to the low beam setting 404. While the first vehicle 100 is traveling uphill, the second vehicle 502 may enter the first glare zone 510*a*. The second vehicle 502 may be near the top of the hill. The second vehicle 502 may be cresting the top of the hill. The sensors 300 of the first vehicle 100 may detect that the second vehicle 502 is within the first glare zone 510*a*. The sensors 300 may detect the presence of light emitted by the lights (e.g., headlights, taillights, brake lights, or a combination thereof) in the first glare zone 510*a*. The sensors 300 may detect the position of the second vehicle 502 to detect the presence of the second vehicle 502 in the first glare zone 510*a*. Upon detection of the second vehicle 502 in the first glare zone 510*a*, one or more processors 314 may communicate to the control system 304 to dim the first light output. The control system 304 may dim the first light output to a light output below the low beam output 406. The light output may be more than no output (i.e., the headlight may not turn off). The light output may be above the legal minimum. The control system 304 may dim one or more headlights. The control system 304 may dim the headlight closest to centerline 508 on the road 500. The control system 304 may dim the headlight positioned on the side of the first vehicle 100 where the driver of the first vehicle 100 is located.

The first vehicle 100 may be in the second glare zone 510*b* (i.e., the glare zone of the second vehicle 502). The first vehicle 100 may be in the second glare zone 510*b* while the second vehicle 502 is in the first glare zone 510*a*. The first vehicle 100 may be in the second glare zone 510*b* while the second vehicle 502 is not in the second glare. The second vehicle 502 may be in the first glare zone 510*a* while the first vehicle 100 is not the second glare zone 510*b*.

Figure 12:
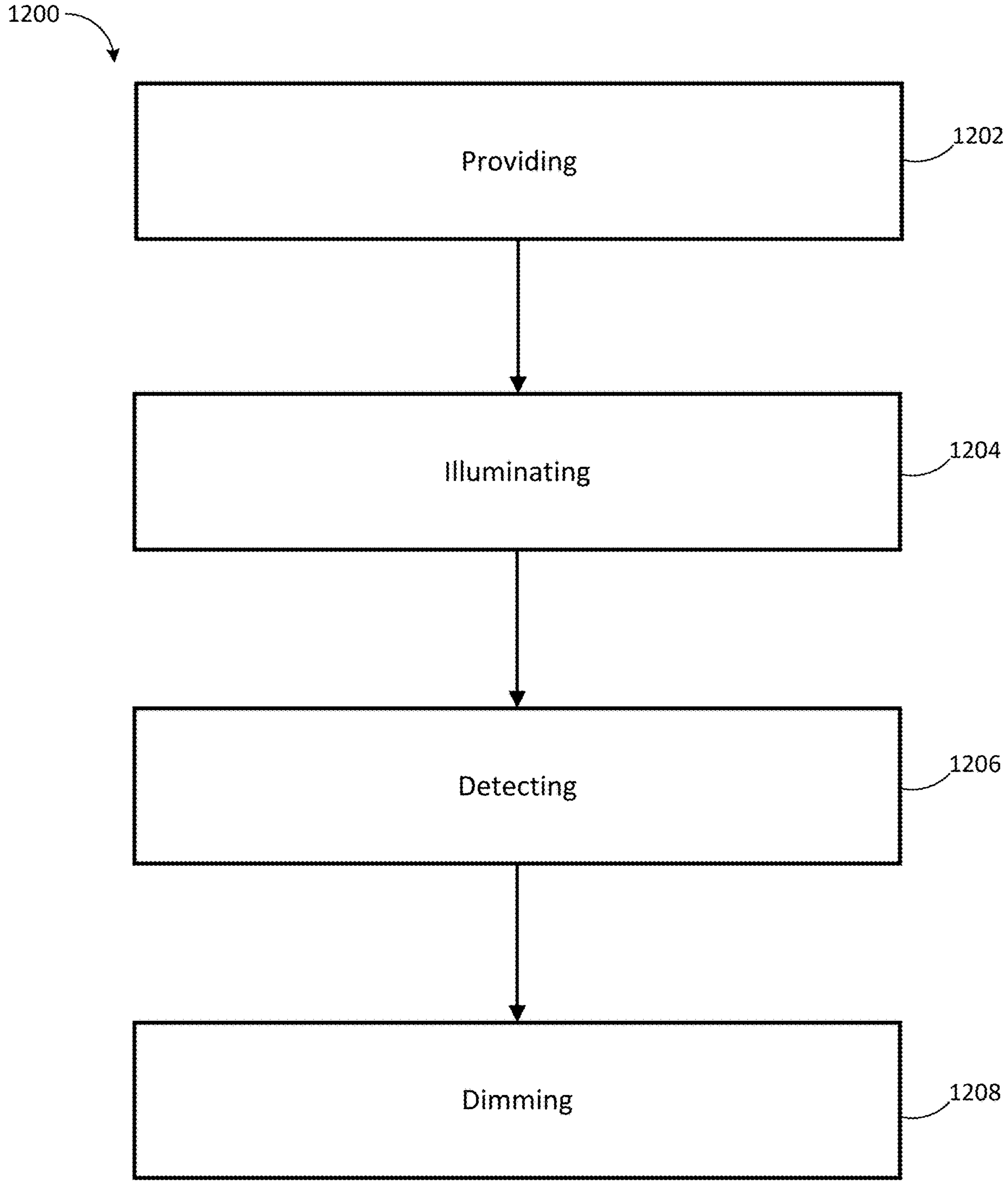
FIG. 12 is a flow diagram illustrating a method.

FIG. 12 is a flow diagram of a method 1200. The method 1200 may include providing 1202 light from the first vehicle 100. The first vehicle 100 may include one or more headlights (e.g., a first headlight and a second headlight), a light system 102 and/or external lights 308 and one or more sensors 300. The method 1200 may include illuminating 1204 a portion of the road 500 using the headlight. The method 1200 may include illuminating 1204 a portion of the road 500 using the low beam setting 404 of the headlight. The method 1200 may include detecting 1206 the presence of a second vehicle 502 using the one or more sensors 300 of the first vehicle 100. The method 1200 may include detecting 1206 the presence of the second vehicle 502 while the first vehicle 100 is active with the low beam setting 404. The method 1200 may include dimming 1208 the first headlight to a first light output below the low beam setting 404. The dimming 1208 may be in response to detecting 1206 the presence of the second vehicle 502.

Figure 13:
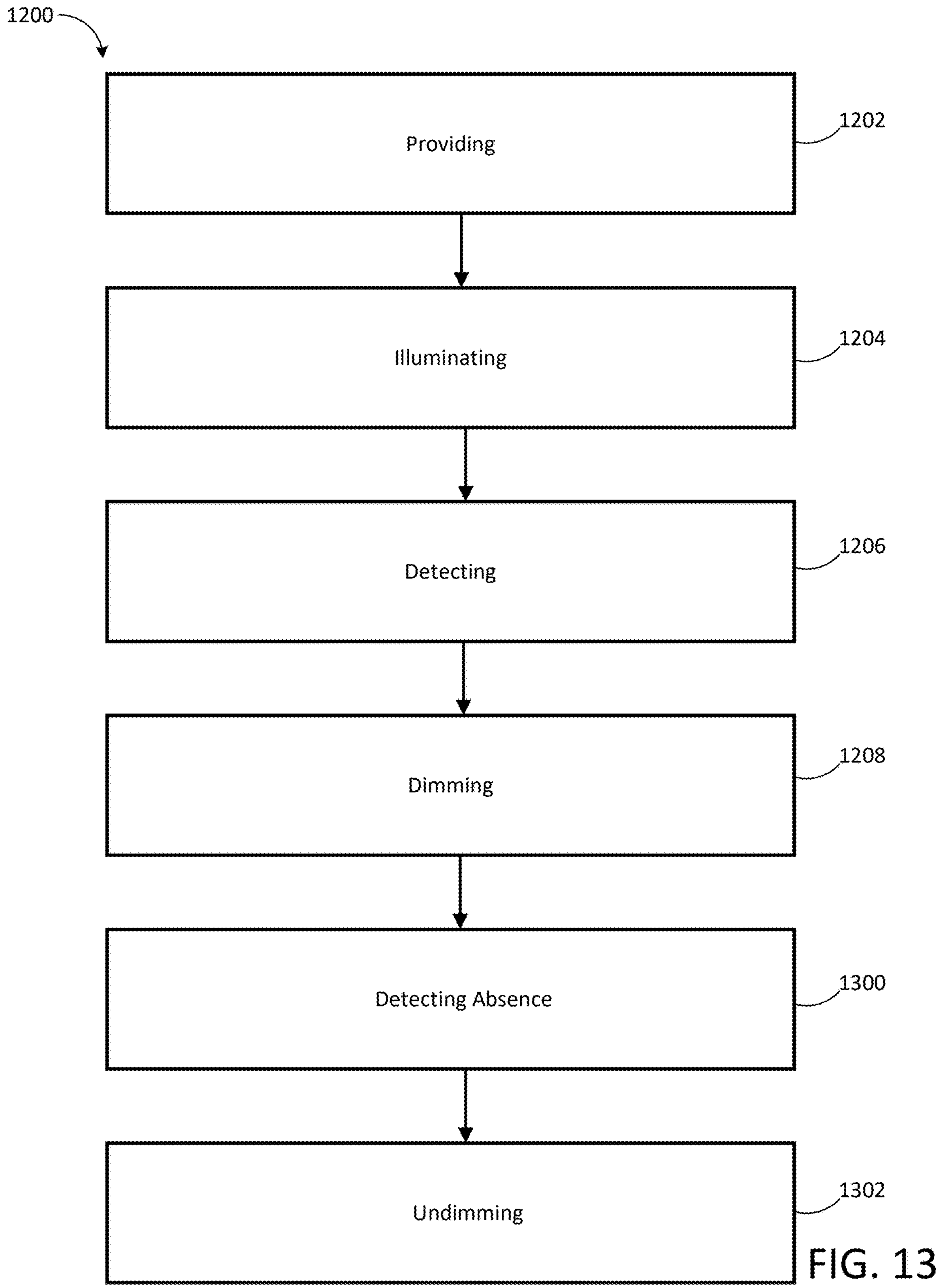
FIG. 13 is a flow diagram illustrating a method.

FIG. 13 is a flow diagram of a method 1200. The method 1200 may include providing 1202 light from the first vehicle 100. The first vehicle 100 may include one or more headlights (e.g., a first headlight and a second headlight), a light system 102 and/or external lights 308 and one or more sensors 300. The method 1200 may include illuminating 1204 a portion of the road 500 using the headlight. The method 1200 may include illuminating 1204 a portion of the road 500 using the low beam setting 404 of the headlight. The method 1200 may include the first vehicle 100 being active with the low beam setting 404. The method 1200 may include detecting 1206 the presence of a second vehicle 502 using the one or more sensors 300 of the first vehicle 100. The method 1200 may include detecting 1206 light emitted from the second vehicle 502. The method 1200 may include detecting 1206 the presence of the second vehicle 502 while the first vehicle is in the low beam setting 404. The method 1200 may include dimming 1208 the first headlight to a first light output (i.e., low beam output 406) below the low beam setting 404. The dimming 1208 may be in response to detecting the presence of the second vehicle 502. The method 1200 may include the sensors 300 of the first vehicle 100 detecting an absence 1300 of the second vehicle 502 in the glare zone 510. The method 1200 may include detecting the absence 1300 of light emitted from the second vehicle 502 in the glare zone 510. The method 1200 may include undimming 1302, the first headlight in response to the absence of light detected in the glare zone 510. The method 1200 may include undimming 1302 the first light output to the low beam setting 404.

Figure 14:
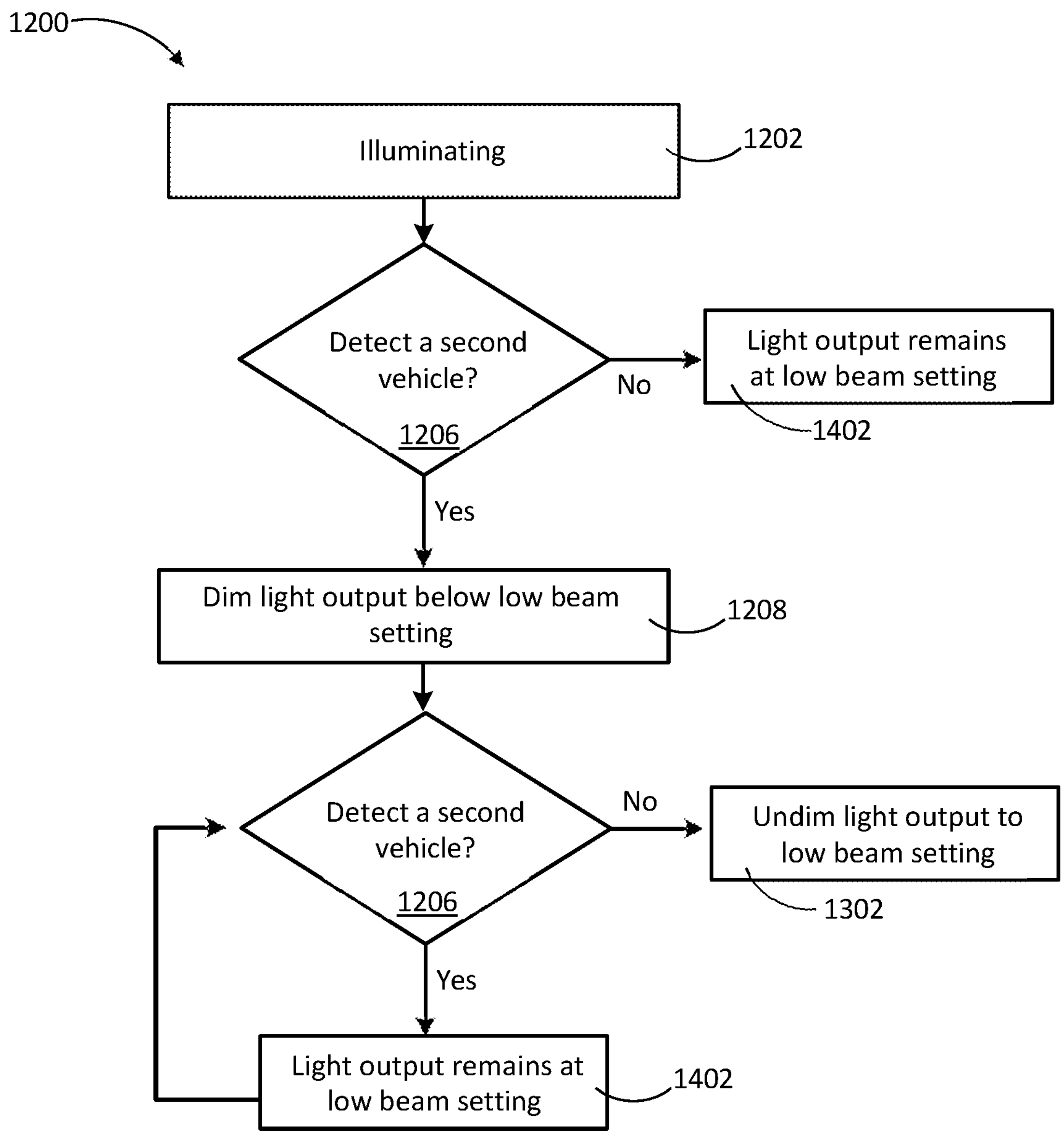
FIG. 14 is a decision tree illustrating a method.

FIG. 14 is a decision tree of the method 1200. For example, the first vehicle 100 may be illuminating 1204 a portion of the road 500 using one or more headlights (e.g., the light system 102, external lights 308). One or more headlights (e.g., a first headlight and a second headlight) may be active with the low beam setting 404. One or more headlights may be providing 1202 a first light output (i.e., the low beam output 406). As the first vehicle 100 is traveling the road 500, the first vehicle 100 may detect 1206 a second vehicle 502 using one or more sensors 300 of the first vehicle 100. If the second vehicle 502 is not within the glare zone 510 of the first vehicle 100, the light output of the headlight of the first vehicle 100 remains active with the low beam output 406. If the second vehicle 502 is within the glare zone 510 of the first vehicle 100, one or more processors 314 may execute software 312 stored in memory 310 to communicate to the control system 304 to dim 1208 the first light output. The control system 304 may dim 1208 the first light output to a light output below the low beam setting 404. The control system 304 may dim both headlights (e.g., the first and second headlight). The control system 304 may dim only the first headlight (e.g., the headlight closest to the second vehicle 502, the headlight positioned on the same side of the first vehicle 100 that the driver is located, etc.) The first vehicle 100 may continue to travel the road 500. The first vehicle 100 may continue to detect 1206 the presence of the second vehicle 502. If the first vehicle 100 continues to detect 1206 the presence of the second vehicle 502 within the glare zone 510, the headlight of the first vehicle 100 may remain 1402 at a light output below the low beam output 406 (i.e., the first light output). If the first vehicle 100 does not detect 1206 the second vehicle 502, the headlights may return (i.e., undim 1302) to the low beam output 406. This process may repeat as the first vehicle 100 encounters other vehicles on the road 500.

While the disclosure has been discussed in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

providing light from a first vehicle comprising:

a first headlight and one or more sensors;

illuminating, by the first headlight in a low beam setting, a portion of a road that the first vehicle is traveling along;

detecting a presence of a second vehicle with the one or more sensors, which the first vehicle is active with the low beam setting; and dimming, in response to the detecting, the first headlight to a first light output below the low beam setting;

wherein the first vehicle further comprises a control system configured to control the first headlight, and wherein the dimming further comprises controlling the first light output using the control system such that the first light output from the first headlight is changed and the light output from a second headlight of the first vehicle is unchanged.

2. The method of claim 1, wherein:
the first headlight comprises a low beam light source corresponding to the low beam setting; and
the dimming further comprises dimming the low beam light source.

3. The method of claim 1, wherein the one or more sensors are forward facing in a direction of travel of the first vehicle.

4. The method of claim 1, wherein a plane corresponds to a threshold for a glare zone corresponding to the low beam setting, and wherein the one or more sensors detect a presence of the second vehicle in the glare zone.

5. The method of claim 1, wherein the detecting further comprises using the one or more sensors to detect light emanating from the second vehicle.

6. The method of claim 1, wherein the detecting further comprises detecting the presence of the second vehicle in a glare zone corresponding to the low beam setting.

7. The method of claim 6, further comprising:
detecting, after the dimming, an absence of the second vehicle in the glare zone; and
undimming the first headlight in response to the detecting the absence.

8. The method of claim 5, wherein:
detecting, after the dimming, an absence of light from the second vehicle in a glare zone; and
undimming the first headlight in response to the detecting the absence of the light from the second vehicle.

9. The method of claim 1, wherein the first vehicle further comprises one or more processors running software configured to control the first headlight.

10. The method of claim 9, wherein the dimming further comprises controlling, while the second vehicle is in a glare zone corresponding to the low beam setting, the first light output of one headlight using the software.

11. The method of claim 1, wherein the first light output is at or above 500 lumens.

12. The method of claim 1, wherein:
the first headlight is positioned on a first side of the vehicle;
the vehicle further comprises a second headlight positioned on a second side of the vehicle and a control system configured to control the first headlight and the second headlight; and
dimming further comprises controlling the first light output using the control system.

13. The method of claim 1, wherein the first vehicle travels in a first lane of the road in a first direction and detects the second vehicle traveling on a second lane of the road in a second direction towards the first vehicle.

14. The method of claim 1, wherein the first vehicle further comprises a control system configured to control the first headlight.

15. A method comprising:
providing light from a first vehicle comprising:
a first headlight and one or more sensors;
illuminating, by the first headlight in a low beam setting, a portion of a road that the first vehicle is traveling along;
detecting a presence of a second vehicle with the one or more sensors, which the first vehicle is active with the low beam setting; and
dimming, in response to the detecting, the first headlight to a first light output below the low beam setting;
wherein the first vehicle further comprises a control system configured to control the first headlight, and
wherein the dimming further comprises dimming an entire low beam pattern of the first headlight.

16. The method of claim 14, wherein the dimming further comprises controlling, while the second vehicle is in a glare zone corresponding to the low beam setting, the first light output of the first headlight using the control system and a second light output from a second headlight of the vehicle is unchanged.

17. A system of a first vehicle, the system comprising:
a processing system;
memory operably connected to the processing system and storing instructions that, when executed, cause the processing system to:
detect, while the first vehicle is in a low beam setting, a presence of a second vehicle; and
dim, in response to the detecting the presence of the second vehicle, a headlight of the first vehicle to a light output below the low beam setting;
wherein the dimming of the headlight of the first vehicle further comprises controlling the first light output using the processing system such that the first light output from the first headlight is changed and the light output from a second headlight of the first vehicle is unchanged.

18. The system of claim 17, wherein:
the instructions define a threshold of a glare zone relative to the low beam setting; and
the detecting comprises detecting the presence of the second vehicle in the glare zone.

19. The system of claim 17, wherein the instructions, when executed, further cause the processing system to:
detect, after the dimming, an absence of the second vehicle; and
increase the light output to the low beam setting in response to the detecting the absence of the second vehicle.

20. The system of claim 17, wherein the dimming further comprises dimming an entire low beam pattern of the first headlight.

* * * * *